United States Patent Office 3,448,947
Patented June 10, 1969

3,448,947
FUEL THROTTLING COMPUTER
Woodrow Seamone, Rockville, Md., assignor to the United States of America as represented by the Secretary of the Navy
Filed Jan. 30, 1967, Ser. No. 614,526
Int. Cl. B64c *13/50;* B64d *31/00*
U.S. Cl. 244—77                                              7 Claims

ABSTRACT OF THE DISCLOSURE

The apparatus is for use in a missile which uses a ramjet engine and provides a control system to modulate fuel flow to the engine. This is accomplished by limiting the maximum fuel flow to the engine as a function of missile attitude and speed.

---

This invention relates to control systems and more particularly to an electronic fuel throttling computer for modulating fuel flow to provide override signals in a ramjet missile mach control loop thereby limiting the maximum fuel flow to the missile engine as a function of the angle of attack.

A ramjet engine is one of the simplest of air operated propulsion engines. In flight it operates by air flowing at high velocity through an intake into a diffuser section which is shaped to reduce the air speed of the air flow and hence increase the air pressure. This higher pressure air enters a combustion chamber where fuel is continuously injected and burned. The hot gases that are produced as a product of this combustion are ejected rearwardly through a discharge nozzle into the atmosphere to create the propelling force of the ramjet engine. The efficiency of the ramjet operation, when in flight, depends to a substantial extent upon the ability of the combustion chamber to convert the chemical energy in the injected fuel into increased air stream velocity. The amount of increase obtained depends upon the ratio of the pressure in the combustion chamber to that of the ambient air pressure and this pressure ratio in turn depends upon the flight mach member.

Under conditions of static operation the ramjet engine has no thrust since there is no increase in pressure through the diffuser section because of zero air stream flow. As the flight speed of the ramjet engine carrying vehicle increases the efficiency of engine operation will increase until for given flight a maximum of thrust is obtained. This point is reached when the amount of fuel injected in the combustion chamber burns all of the oxygen present in the air which is passing through the chamber. Since the ramjet engine has little or no thrust at low speeds, it is necessary to provide other types of engines to bring speed up to the point at which the ramjet engine will provide sufficient thrust to propel the vehicle it is mounted on. Once the propelled vehicle has reached ramjet operating speed the engine or engines that provided the initial thrust may be rendered inoperative and, if desired, jettisoned. At this point the ramjet engine must be able to maintain the propulsive force required to propel the missile in accordance with the predetermined program of attack.

The instant invention is to a fuel control system that modulates the fuel flow to an operating ramjet engine mounted on an aerodynamic vehicle by combining the electrical outputs of angle of attack computation and a mach sensor. This combined voltage magnitude is fed to an electrical servo line that mechanically operates a valve in the fuel regulator system. In this way rich limit fuel flow in the bellofram section of the fuel regulator is modulated between rich and lean limits by appropriate positioning of the valve in the fuel regulator in accordance with the error voltage at the input to the electrical servo link.

An object of this invention is to provide an improved fuel control apparatus for a ramjet engine.

A further object of this invention is to provide an electronic fuel flow control apparatus for a ramjet engine.

Another object of the present invention is to provide an electronic fuel throttling computer that is reliable and more compact than prior art devices.

Another object of the present invention is to provide an electronic fuel throttling computer for a ramjet engine that is more accurate and has faster response than prior art devices.

Still another object of the present invention is the provision of an apparatus that uses mach control signals to limit the maximum fuel flow to the engine as a function of angle of attack.

A further object of the present invention is to provide a fuel control system for an engine that adjusts the fuel to the engine in accordance with predetermined relationships between mach number and angle of attack data.

Other objects, advantages and novel features of the invention will become apparent from the following detailed description of the invention when considered in conjunction with the accompanying drawings wherein.

Figure 1:
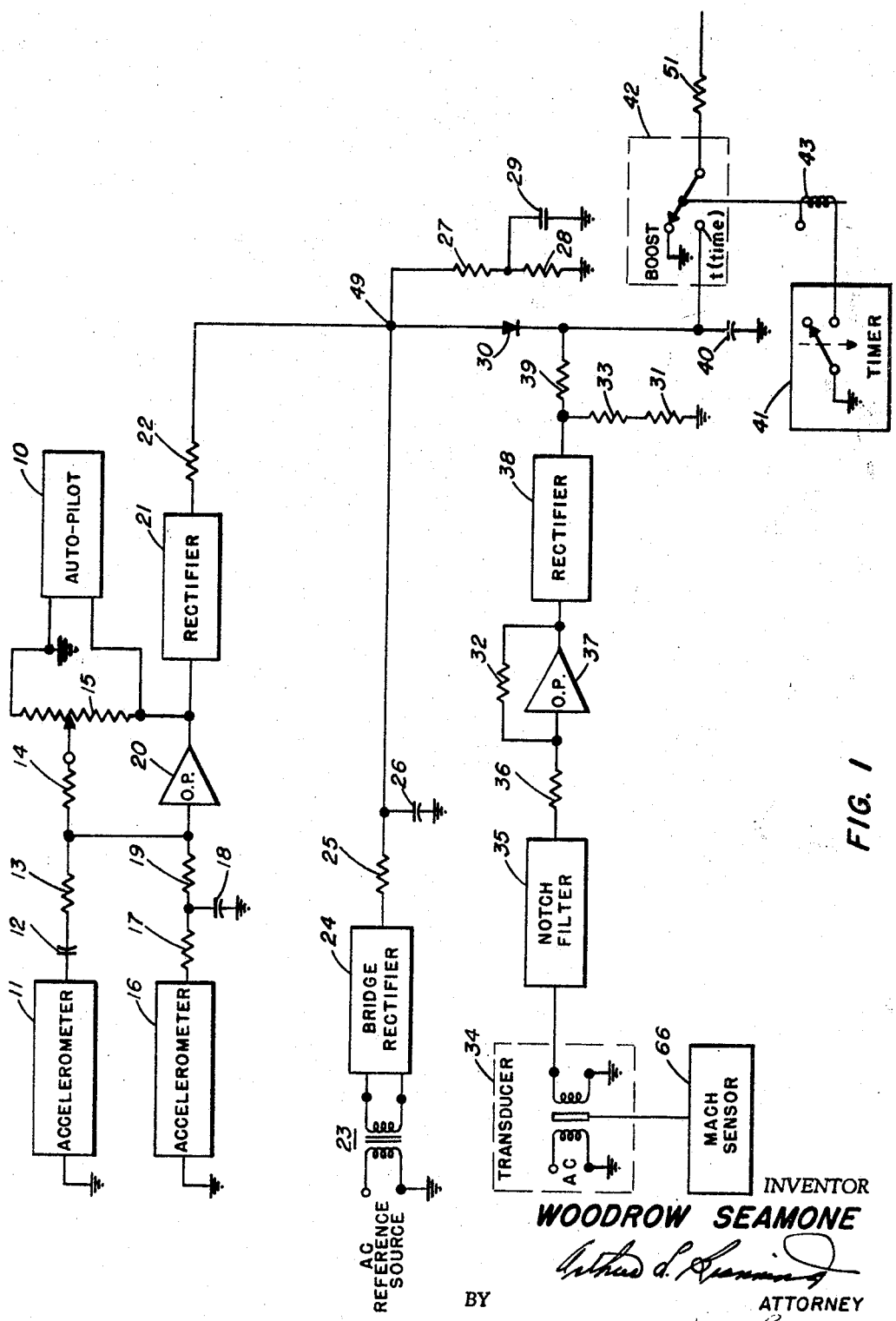
FIG. 1 illustrates a functional block diagram of the sensing apparatus of the fuel throttling computer system.
Figure 2:
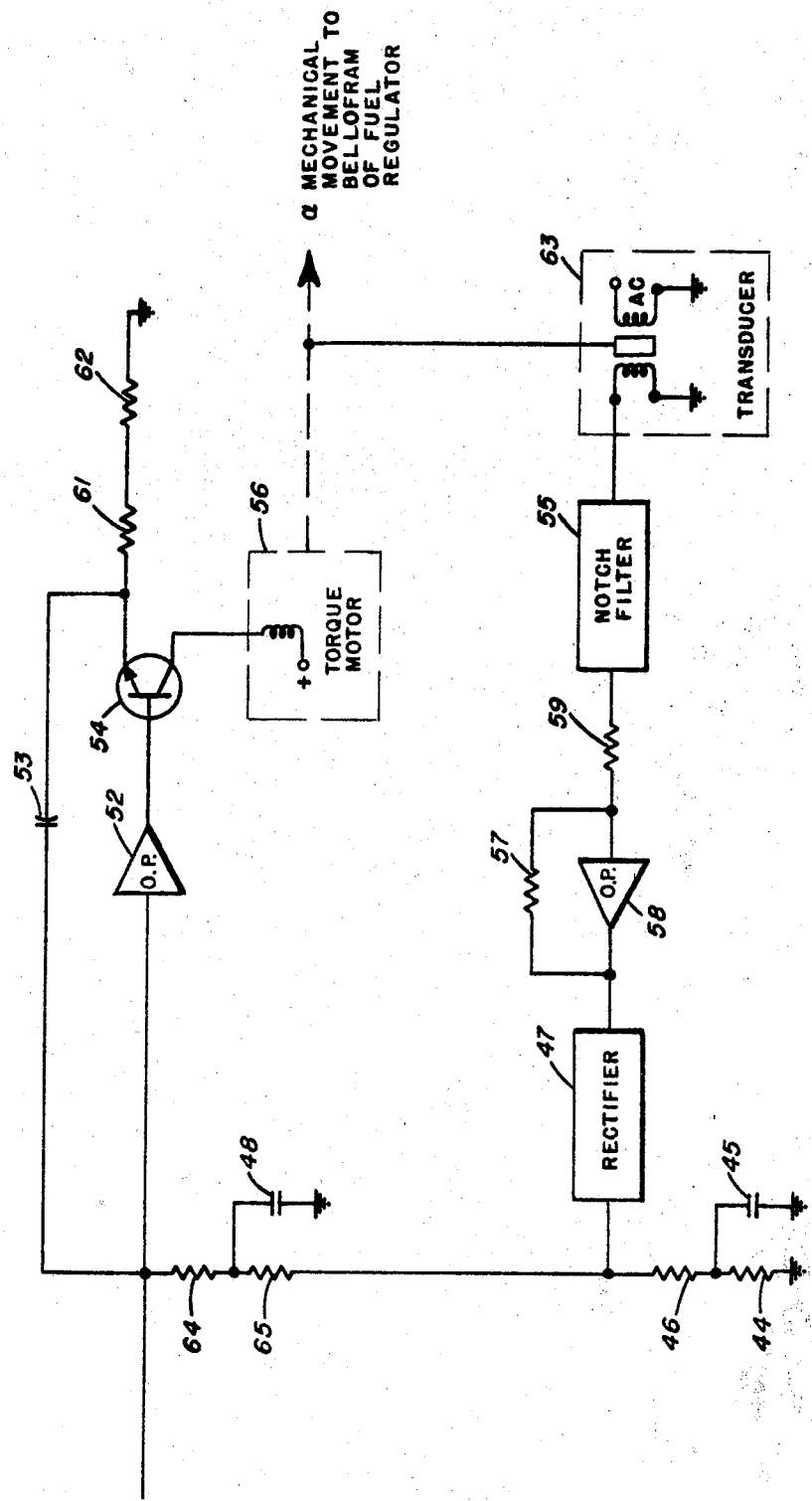
FIG. 2 illustrates the functional block diagram of the electrical servo link between the sensing apparatus and the fuel regulator loop.

Referring to FIG. 1, which illustrates a functional block diagram of the fuel throttling computer, numerals 11 and 16 represent linear accelerometers. The accelerometers have their sensing axes oriented 90° with respect to one another such that one is aligned parallel to the longitudinal axis and one is aligned parallel to the vertical axis. As illustrated the electrical output representative of the external conditions on accelerometer 11 is coupled to the input of operational amplifier 20 via a series resistive network of coupling capacitor 12 and resistance 13. Accelerometer 16 has its signal output also coupled to operational amplifier 20 via a resistive capacitive network. This network is constructed by coupling resistor 17 in series with resistor 19. Resistor 19 is then coupled at its other end to the input of operational amplifier 20. A bypass capacitor 18 is then coupled between ground and the two series resistors 17 and 19, respectively. The output of operational amplifier 20 appears across potentiometer 15. One side of this potentiometer is electrically coupled to the output side of amplifier 20 and the other side is coupled to ground potential. Also coupled across potentiometer 15 is an output signal ($P_t$) which is obtained from the autopilot 10. This signal voltage is representative of the ram pressure. The movable arm of potentiometer 15 is coupled in a resistive feedback circuit to permit an adjusting feedback voltage to be fed to the input of amplifier 20. This resistive feedback network is represented by series resistor 14. The combined signal output across potentiometer 15 to ground is coupled to the input of full wave rectifier 21 and the rectified component of rectifier 21 is coupled so that it appears across a voltage divider network to ground. A series resistance 22 couples the output of rectifier 21 to junction 49. Network resistors 27 and 28 are connected in series to ground potential and bypass capacitor 29 is coupled in parallel relationship with resistor 28 to ground potential.

A negative DC reference voltage is coupled between resistors 22 and 27, respectively. This voltage is obtained by rectification of an AC reference source (not shown) coupled to bridge rectifier 24 by means of coupling transformer 23. The negative direct current output from bridge rectifier 24 is coupled to resistor 27 at junction 49 via a resistor-capacitor network formed of series resistor 25 and a bypass capacitor 26 to ground. The cathode of diode 30 is coupled to the *t* (time) switch terminal of switch 42 and diode 30 has its anode connected to one side of resistor 27 via junction 49. A bypass capacitor 40 couples terminal *t* to ground potential.

A mach sensor electrical signal output is also electrically coupled to the (*t*) switch terminal. This voltage is generated by actuation of mach sensor 66 which is mechanically coupled to reproduce this activation with a magnitude of voltage by means of transducer 34. This is accomplished by coupling an AC signal to the input of transducer 34 and varying the signal by sensor 66 to produce an AC output voltage whose magnitude is representative of the mach number. This electrical output is fed to an AC operational amplifier 37 via a notch filter 35 and a series resistance 36. A portion of the output of amplifier 37 is fed back to the input via a resistive feedback circuit represented by resistance 32. The output of operational amplifier 37 is electrically coupled to terminal *t* (time) of switch 42 via a rectifier 38 and series resistance 39. The DC output of rectifier 38 appears across load resistors 31 and 33 which are series connected from the rectifier to ground potential.

Switch 42 is a single pole, single throw switch having a boost terminal which is connected electrically to ground potential and a *t* (time) terminal which is electrically connected to the above explained circuitry. This switch is electrically operated by means of an electromechanical relay 43. The coil of relay 43 is energized by means of a switch which is mechanically coupled to a sensing mechanism (not shown) and timer as illustrated by block 41. Once the predetermined set time elapses a switch contact in timer 41 closes to apply energy across solenoid coil 43 which in turn operates the switch 42. Switch 42 is mechanically switched between the boost terminal and the *t* (time) terminal on predetermined times under certain environmental conditions. Switch 42 is electrically coupled via series resistance 51 to the input of DC operational amplifier 52. The output of this amplifier is coupled to the base of an NPN power transistor. The emitter of transistor 54 is coupled in a capacitive feedback circuit to the input of amplifier 52 by means of feedback capacitor 53 and is also coupled to ground potential through a series network of emitter resistors 61 and 62, respectively. The collector of transistor 54 is electrically coupled to a positive potential via torque motor 56. The torque motor 56 has an output shaft that is mechanically coupled to move a bellofram fuel regulator (not shown) upon energization of the torque motor winding.

A feedback voltage is generated by transducer 63 which is mechanically coupled to the torque motor output. This transducer modifies the magnitude of an AC signal to give an electrical output whose magnitude is representative of the movement of the torque motor. This electrical output is coupled to the input of an operational amplifier 58 via a notch filter 55 and series resistance 59. The output of operational amplifier 58 is rectified by full wave rectifier 47 and the DC output appears across series load resistances 44 and 46 to ground potential. Operational amplifier 58 has a resistive feedback network connected in parallel circuitry arrangement with it that is represented by resistor 57. A bypass capacitor 45 is connected across resistance 44 to ground potential and series resistance 64 and 65 electrically couple the output of full wave rectifier 47 to the input of operational amplifier 52. A bypass capacitor couples to ground the connection between the series resistors 64 and 65.

In operation the outputs from accelerometers 11 and 16, respectively, provide an in phase electrical signal at a predetermined carrier frequency. This signal represents the magnitude of the acceleration with respect to the two acceleration vectors oriented 90° apart in space. The composite signals are electrically coupled to and mixed in alternating current operational amplifier 20 to provide a signal which is a function of the change of angle of attack of the vehicle. Amplifier 20 has a feedback resistive circuit of potentiometer 15 and series resistance 14 which couples to the input of amplifier 20 a signal to vary the gain of the amplifier. Autopilot 10 is coupled across potentiometer 15 to supply a signal representative of ram pressure and causes the amplifier gain to vary inversely with respect to this signal so that amplifier 20's output is proportional to $G(P_t)$. This signal is rectified in rectifier 21 and appears as a direct current signal from junction 49 to ground potential. This signal is positive and varies over a range of voltage dependent on sensing accelerometers 11 and 16.

A reference direct current signal is generated from an AC reference source rectifier by rectifier 24. This direct current reference negative voltage is also coupled to junction 49 via resistor 25 and by pass capacitor 26. The reference signal magnitude is predetermined from empirical data which may be modified to obtain other desirable control conditions.

The composite voltage from junction 49 is coupled to *t* (time) terminal of switch 42. Another signal is coupled to *t* (time) terminal from the mach control loop which is generated by mach sensor 66 and mach transducer 34. The electrical signal from the transducer is filtered by filter 35 and coupled to a rectifier 38 via operational amplifier 37. The rectifier converts the AC signal to a negative signal which is mixed with the output from junction 49. The error signal is coupled through switch 42 when it is in the *t* (time) position to the input of operational amplifier 52. The output signal from operational amplifier 52 is coupled via a power transistor circuitry arrangement to a torque motor to mechanically operate the Bellofram of the fuel regulator to regulate the fuel flow between rich and lean limits in accordance with the mach error voltage.

In order to provide accuracy of control on the mechanical position of the Bellofram a closed loop is used around torque motor 56. An electrical signal is produced by the transducer 63 and is coupled back to the input as a feedback voltage via mixing and shaping by the operational amplifier 58 and associated circuitry.

The operation of switch 42 between boost and *t* (time) permits the Bellofram to operate independent of the mach error signal during the time that timer 41 is operating. The timer 41 is set to a predetermined operating time to permit the Bellofram to be commanded to a fixed fuel flow position until a predetermined time after boost separation. At this time timer 41 will move the switch arm of switch 42 to *t* (time) position and the mach sensor error voltage is permitted to command the operation of the Bellofram in its normal mode.

Obviously many modifications and variations of the present invention are possible in the light of the above teachings.

What is claimed is:
1. An apparatus for controlling the amount of fuel delivered to a missile rocket engine comprising:
  attitude change responsive means having first and second orthoganally aligned accelerometers;
  said attitude change responsive means being operative to yield an electrical signal which is indicative of a function of the change in attitude of said missile;
  reference means electrically connected to said attitude change responsive means for providing an electrical signal output;
  mach sensing means electrically connected to mix with the output of said reference means and said attitude sensing means for providing a composite signal output; and
  mechanical fuel regulating means electrically coupled to receive the composite output of said mach sensing means, said reference means and said attitude sensing means to produce movement in response to the composite signal;

whereby the mechanical means is caused to vary in response to missile attitude change and mach number to increase and decrease the fuel delivered to the engine within predetermined limits.

2. An apparatus of claim 1 wherein said attitude change sensing means further includes:
   operational amplifier means electrically coupled to receive the outputs of said first and second accelerometers; and
   rectifier means electrically coupled to said operational means for changing said operational amplifier output to a direct current voltage.

3. The apparatus of claim 1 wherein said reference means comprises:
   alternating current reference source; and
   bridge rectifier means electrically coupled to said source for providing a predetermined direct current output.

4. The apparatus of claim 1 wherein said mach sensing means comprises:
   transducer means for providing an electrical output proportional to the mach number;
   notched filter means electrically coupled to said transducer means;
   operational amplifier means electrically coupled to said notched filter; and
   rectifier means electrically coupled to said operational amplifier for providing a direct current output that is proportional to said mach number.

5. The apparatus of claim 1 wherein said mechanical fuel regulating means comprises:
   switch means operable between two positions;
   operational amplifier means electrically coupled to said switch means;
   torque motor means electrically coupled to said operational amplifier to provide mechanical movement in response to said operational amplifier output; and
   feedback means coupled from said torque motor to the input of said operational amplifier.

6. The apparatus of claim 5 wherein said feedback means comprises:
   transducer means coupled to said torque motor means for providing an electrical signal proportional to the mechanical movement of said torque motor.

7. The apparatus of claim 5 wherein said switch means comprises:
   a switch operable between a first and second position,
   said switching occuring a predetermined time after operation of the missile rocket engine.

References Cited

UNITED STATES PATENTS

| | | | |
|---|---|---|---|
| 2,948,496 | 8/1960 | Joline | 244—77 |
| 3,116,042 | 12/1963 | Richter et al. | 244—77 |
| 3,327,972 | 6/1967 | Greene | 244—77 |
| 3,379,396 | 4/1968 | Patterson | 244—77 |

FERGUS S. MIDDLETON, *Primary Examiner.*